March 11, 1969   JIRI HRDINA   3,431,789
DRIVE MECHANISM FOR OSCILLATING DEVICES, PARTICULARLY
CONTROL RODS
Filed March 29, 1967

INVENTOR.
JIRI HRDINA
BY
Attorney

United States Patent Office 3,431,789
Patented Mar. 11, 1969

3,431,789
DRIVE MECHANISM FOR OSCILLATING DEVICES, PARTICULARLY CONTROL RODS
Jiri Hrdina, Prague, Czechoslovakia, assignor to Ceskoslovenska Akademie ved, Prague, Czechoslovakia
Filed Mar. 29, 1967, Ser. No. 626,878
U.S. Cl. 74—54                                           3 Claims
Int. Cl. F16h 25/16

ABSTRACT OF THE DISCLOSURE

An articulated linkage mechanism adapted to impart oscillation of at least 180° to a spindle; the mechanism comprises an arm caused to oscillate about a pivot through an angle of not more than 120° whereby the imaginary axis of the spindle intersects the area swept by the oscillating arm, a lever rigidly affixed to the spindle at one end and pivotally attached to a link at the other end, said link, in turn, being pivotally secured to the freely-swinging end of the oscillating arm.

---

This invention relates to an articulated, oscillating mechanism for driving the spindle of a control rod or similar device adapted to oscillate about an angle of 180° or more.

Control rods of precision pumps used in laboratories are, for some purposes, required to have a range of oscillation of about 180° or more. The devices of solely articulated structure known heretofore, however, usually have a range of only 90–120°. For oscillations through a range close to or over 180°, solely articulated structures have not been sufficient and it has been necessary to use auxiliary rack-and-pinion or cable-and-drum mechanisms.

It is, therefore, an object of the invention to provide an improved oscillating mechanism of a solely articulated structure adapted to impart an oscillating motion to a spindle through an angle of at least 180°.

Further objects and advantages will become more apparent and the invention will be better understood from the ensuing specification of a preferred exemplary embodiment taken in conjunction with the drawing, wherein.

Figure 1:
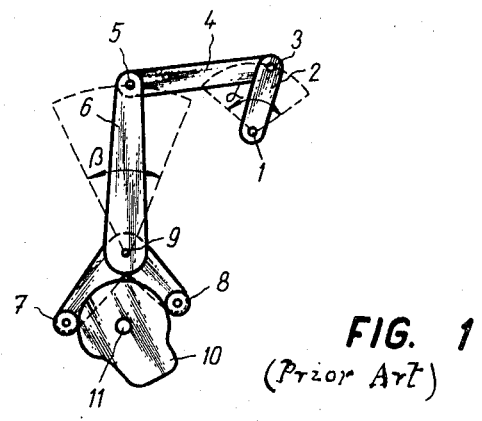
FIG. 1 is a schematic elevational representation of the prior art.

In FIG. 1 there is shown a known articulated structure wherein the spindle 1 of a control rod (not shown) is adapted to oscillate through a maximum angle α of 120°. Spindle 1 is oscillated by a lever 2 rigidly affixed thereto. Lever 2 is connected by means of pivotal joint 3 to the actuating rod 4 which, in turn, is attached through pivotal joint 5 to a forked bell crank 6. Bell crank 6, pivotally secured at 9, carries at its ends remote from joint 5 two spaced follower rollers 7 and 8 engaging a cam wheel 10 rotating about cam axle 11. The rotary motion of cam wheel 10 causes an oscillating motion of bell crank 6 through an angle β. This mechanism is unsuitable for causing an oscillation of spindle 1 of 180° or more, because at either extreme of such a wide-angle oscillation a zero angle would appear between the actuating rod 4 and lever 2 causing dead centering of the mechanism in these positions.

As mentioned hereinabove, for achieving an oscillation of spindle 1 of about 180°, it has been heretofore necessary to complement the solely articulated linkage mechanism with rack-and-pinion or cable-and-drum members.

Figure 2:
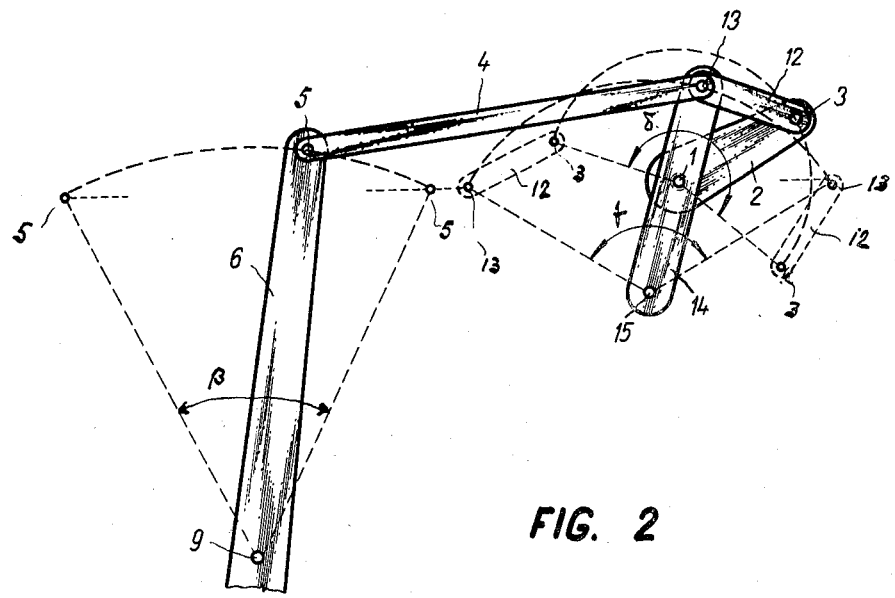
FIG. 2 is a schematic elevational view of an exemplary embodiment of the invention.

Turning now to FIG. 2, there is shown an improved, solely articulated mechanism adapted to impart an oscillating motion to spindle 1 through an angle δ close to or in excess of 180°. Spindle 1 of a control rod (not shown) is fixedly secured to lever 2 which is connected to a link 12 which, in turn, is attached by means of pivotal joint 13 to the auxiliary oscillating arm 14 adapted to oscillate through an angle γ substantially less than 180° about stationary pin 15. In the exemplary structure shown, the angle of oscillation of auxiliary arm 14 is 120°. It is noted that the projection of spindle 1 lies within the area of oscillation of arm 14 or, stated in other words, the imaginary axis of spindle 1 intersects the area swept by arm 14. The oscillating motion of auxiliary arm 14 is caused by actuating rod 4 pivotally secured thereto and to link 12 by means of pivotal joint 13. Rod 4, in turn, may be reciprocated by a device similar to that of FIG. 1 comprising a bell crank 6 oscillating through an angle β about pivot 9 and being secured to actuating rod 4 by means of pivotal joint 5. The joints 3, 5 and 13, their radius of oscillation, and link 12 are shown in their two extreme positions in broken lines.

Although only a single embodiment of the invention has been depicted and described, it will be apparent that this embodiment is illustrative in nature and that a number of modifications in the apparatus and variations in its end use may be effected without departing from the spirit or scope of the invention as defined in the appended claims.

That which is claimed is:

1. An oscillating linkage mechanism adapted to impart an oscillating rotation to a spindle through an angle in excess of 180° comprising:
   (a) an arm seated with one end on a first pivot to oscillate thereabout through an angle smaller than 180° and having a free end;
   (b) a lever with one end rigidly secured to said spindle oscillating the same through an angle in excess of 180° and having a free end, the axis of rotation of said spindle intersecting the area swept by said arm during its oscillation;
   (c) a link pivotally interconnecting said free end of said arm and said free end of said lever, and
   (d) means for imparting an oscillating motion to said arm.

2. A mechanism as defined in claim 1, wherein said means for imparting an oscillating motion to said arm comprises an actuating rod one end of which being pivotally secured to said arm.

3. A mechanism as defined in claim 2, wherein the other end of said actuating rod is pivotally attached to a bell crank oscillatable by driving means about a second pivot spaced from said first pivot.

References Cited

UNITED STATES PATENTS 2,378,676    6/1945    Ambruster _____ 74—54

FOREIGN PATENTS 566,185    11/1958    Canada.

FRED C. MATTERN, Jr., *Primary Examiner.*
W. S. RATLIFF, Jr., *Assistant Examiner.*